United States Patent [19]

Haas et al.

[11] 3,934,043

[45] Jan. 20, 1976

[54] PROCESS FOR MANUFACTURING HOLLOW PASTRIES

[76] Inventors: Franz Haas, Gerstlgasse 25; Franz Haas, Deublergasse 29, both of Vienna 21; Johann Haas, Wiener Strasse 209, Spillern, N.O., all of Austria

[22] Filed: Mar. 22, 1974

[21] Appl. No.: 454,019

[30] Foreign Application Priority Data

Mar. 23, 1973 Austria .............................. 2602/73

[52] U.S. Cl. ............... 426/283; 426/297; 99/450.6
[51] Int. Cl.² ........................................... A23G 3/00
[58] Field of Search ................... 426/138, 283, 284; 99/450.1–450.6; 156/195

[56] References Cited

UNITED STATES PATENTS

| | | | |
|---|---|---|---|
| 3,018,212 | 1/1962 | Chinn | 156/195 |
| 3,385,179 | 5/1968 | Roe | 156/195 X |
| 3,698,309 | 10/1972 | Steels | 99/450.1 |
| 3,700,520 | 10/1972 | Hielema | 156/195 X |
| 3,793,938 | 2/1974 | Haas | 99/450.6 |

FOREIGN PATENTS OR APPLICATIONS 262,187 6/1968 Austria .............................. 99/450.6

*Primary Examiner*—Raymond N. Jones
*Attorney, Agent, or Firm*—John J. Dennemeyer

[57] ABSTRACT

A process for producing hollow pastries wherein a strip of pastry dough is wound off a rotary drum on a winding spindle disposed relative to the drum to produce a hollow pastry body by spirally overlapping the pastry strip on the spindle. A coating is applied on the inside of the pastry strip from a dispensing nozzle before the strip is wound on the spindle to protect the pastry body from the wet filling introduced subsequently into the hollow pastry body and to bond the overlapping turns of the pastry body to each other.

15 Claims, 3 Drawing Figures

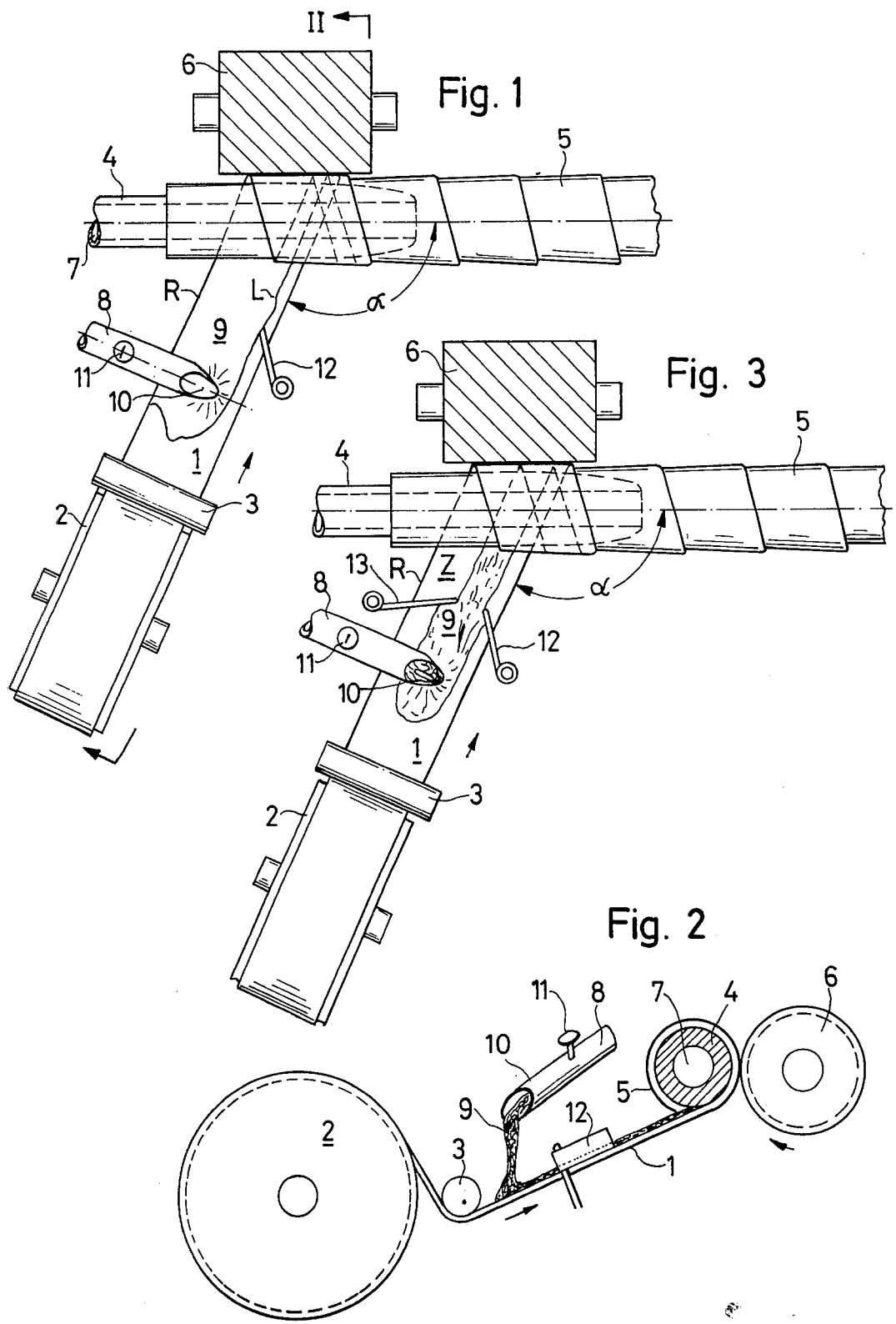

PROCESS FOR MANUFACTURING HOLLOW PASTRIES

The invention relates to a process and apparatus for manufacturing hollow pastries to be filled with a soft filling and to the hollow pastry goods obtained by this process and apparatus. The hollow pastry consists of at least one pastry strip which is wound spirally and in an overlapping manner and is provided on the inside with a coating which provides an insulation relative to the filling.

The pastry baker is familiar with this type of hollow pastry in the form of hollow waffles which are coated on the inside with chocolate and filled with a creamy substance or with ice cream. In recent times very economical processes and apparatus have been developed which accomplish in a single working operation the winding, the coating and the cutting to length of such hollow waffles. As the baked waffle dough becomes very hard upon cooling and drying, the waffles produced in this manner retain their shape, the insulating coating on the inside of the waffle remains impervious, and the soft, wet filling cannot penetrate into the baked, spiral body and soften or even dissolve it.

The food industry is ever attempting to facilitate the daily work of the housewives and cooks. For this purpose the industry prepares and distributes nowadays a large variety of finished food dishes which need to be heated only for a short period and quickly served and eaten. In preparing such dishes, great care must be taken that the individual parts composing a particular dish are compatible, in other words that they do not cause a softening or dissolution of one another, so that the prepared dish retains an appetizing freshness even after extended storage in the wholesale or retail establishment. This requirement has prevented the industry hitherto from preparing particularly tasty prepared dishes which consist of a composition of pastry, such as pancakes, ham, omelettes of biscuits, and a filling like meat, vegetables, cottage cheese or marmelade, as in the case of such dishes a gradual softening or dissolution of the baked product by the filling is to be expected. With regard to a proper insulation between the two incompatible components, no useful proposals have been advanced so far.

It is an object of this invention to fill this obvious gap in the potential offers that could be made by the food industry in view of the developments that have taken place in the strengthened production. The invention is based on hollow pastries of the above mentioned type and consists essentially in that the coating material for bonding the overlapping pastry spirals or turns is also applied between the turns. Due to the mutual bonding of the overlapping pastry turns, the spiral body becomes strenghened and rigidified to such an extent that even when softer baking products are used the form remains stable and the coating applied on the inside remains impervious. Thus the filling cannot diffuse into the hollow pastry even when a baked omelette or a biscuit dough is used and the hollow pastry stays in a freshly baked state.

In those cases where the coating material presents a color tone which is substantially different fron that of the pastry strip and has thus a disturbing effect, for example in the case of chocolate coatings, the preferred embodiment of the invention is characterized in that the overlapping joint contains the coating material only over an area which is open toward the inside while the area which is open toward the outside is free of coating material.

In some cases it may be disired, particularly in complying with special tastes, that the filling should partly wet the pastry strip without completely endangering the rigidity of the hollow bakery article by a complete soaking or softening of the spiral pastry body. This condition may be obtained by multiple, e.g. double or triple overlapping of the pastry strip in that for this purpose the coating material is applied only between the overlapping pastry strip turns. At the same time the outer layers of the pastry strip turns which are insulated against the softening effect of the coating material provide the rigidity of the spiral pastry body.

According to the most recent state of development in the waffle technology, at least one pastry strip is introduced during the manufacture of a hollow pastry article and spirally wound in an overlapping manner, and coating material is applied to the inner wound surface of the pastry strip. In the known embodiment of this process, the coating material is sprayed after the overlapping process on the inner surface of the finished spiral pastry body. Thus the overlapping joints remain essentially free of coating material.

The process of the present invention is different from this prior art in that the coating material is applied on the incoming pastry strip just before the turns overlap. In this manner the coating material is present on the inner wound surface, both as insulation and as bond in the overlapping joint when the overlapping and winding take place subsequently and no additional steps are necessary. The coating material may be applied either, as has been customary, by sprinkling or spraying or, according to a preferred feature of the invention, simply by pouring.

To manufacture the preferred embodiment of the hollow pastries according to the invention, one proceeds appropriately in such a manner that the coating material is applied only over an area of the band width of the pastry strip which extends from the edge produced by the endless coil being generated up to a line which is located within the overlapping zone. However, for the partial contact between the filling and the waffle strip the coating material is applied only on an area of the width of the pastry strip which is located within the overlapping zone.

In order to carry out the process according to the invention, an apparatus is utilized which is provided with a winding spindle, a feeding device disposed at an obtuse angle to the winding spindle for continuously feeding a soft pastry strip to the winding spindle, and a dispensing device for continuously releasing a predetermined amount of coating material on the inner winding surface of the pastry strip. In the embodiment of this apparatus used for the waffle production, the dispensing device is connected to a hollow bore of the winding spindle which terminates in a nozzle directed to the inside of the spiral body that is generated.

However, the invention provides essentially that the dispensing device is arranged between the winding spindle and the feeder device and is directed to the surface of the incoming pastry strip facing the winding spindle. In this manner, the incoming pastry strip is already coated when it reaches the winding spindle and during the winding the desired bonding of the overlapping turns of the winding body takes place without further auxiliary means.

In order to carry out the pouring procedure according to the invention, provision is made that upon introducing the pastry strip at the lower side of the winding spindle the dispensing device have a spout or lip which terminates above the incoming pastry strip. Furthermore, at least one adjustably mounted doctor blade or the like is provided in order to limit the extent of the coating poured on the pastry strip to a predetermined thickness or width transversely of the strip direction.

The hollow bore of the winding spindle used hitherto for introducing the coating material can be quite useful when it is connected according to the invention to a feeding device for dispensing a filling and for introducing the filling into the insulated and bonded spiral body of the hollow pastry goods according to the invention. In this case the apparatus provides simultaneously the winding, the coating and the filling of the pastries.

The invention will be described in greater detail hereafter with reference to the accompanying drawings, in which an embodiment of the apparatus according to the invention is illustrated and in which:

FIG. 1 is a plan view of the apparatus according to the invention,

FIG. 2 is a side view of the apparatus according to FIG. 1, partly in section, and FIG. 3 is a plan view of a modified embodiment of the apparatus according to FIGS. 1 and 2.

Referring now particularly to FIGS. 1 and 2, the reference numeral 1 indicates a strip of pastry material which runs off a baking drum 2 and is conducted over a deflection roller 3 to a winding spindle 4. The winding spindle may be arranged stationary, or it may be rotatable and driven. It is disposed at an obtuse angle $\alpha$ relative to the feeding direction of the pastry strip 1, and the degree of angle is calculated on the basis of a particular desired overlapping of the pastry strip turns that are wound on the winding spindle. The winding and advancing of the spiral body 5 on the winding spindle 4 may be enhanced by means of a driven guide roller 6. The winding spindle may present a longitudinal bore 7 for the direct introduction of a filling, e.g. ice cream, vegetables, etc., that are to be inserted on the inside of the spiral body 5.

In the area between the deflection roller 3 and the winding spindle 4 a dispenser 8 for the coating substance 9 is mounted, and this substance, which may be chocolate, edible fats, etc., flows freely from the dispenser nozzle 10 on the travelling pastry strip 1. The supply from the dispenser 8 may be controlled at 11 by means of an adjustably mounted doctor blade 12. The deposit of coating substance 9 on the pastry strip 1 over a predetermined zone of the strip width is limited and extends from the left strip edge R, i.e. from the formation edge of the spiral body 5, up to a line L in the overlapping region of the strip turns 3. In the finished spiral body 5, the applied coating extends over the entire free inner surface and in each instance only so far into the overlapping joint that from the outside no coating material is visible. The coating is therefore utilized both for the purpose of insulating the spiral body from the filling and for the mutual bonding of the pastry turns. It has been found additionally that particularly in the case of multi-layer overlapping of the pastry turns, the bonding layers located between the overlapping turns contribute also substantially to the improvement, i.e. the guarantee of a proper insulation.

According to FIG. 3, the baking drum 2 is mounted at a more acute angle $\alpha'$ relative to the winding spindle 4 so that the latter produces a double overlap of the incoming pastry strip 1 wherein only a narrow area of the pastry strip forms the free inner surface of the spiral body 5 thus produced. By means of a second adjustable doctor blade 13 at the left edge of the incoming pastry strip 1, the coating substance 9 deposited at 10 is also forced back from the formation edge R of the spiral body 5. Accordingly the left edge zone Z which is thus maintained free of coating and which constitutes the inner surface of the spiral body after the winding operation remains exposed to the entry of a filling and may react therewith for taste purposes while the rigidity of the hollow pastry article is assured by the outer layers of the spiral body 5 which is insulated at the overlapping surfaces by the coating substance.

What is claimed is:

1. In a process for producing hollow filled pastries by the steps of providing a soft baked pastry strip, winding said pastry strip in an overlapping spiral about a spindle thereby providing said strip with a shape having a hollow interior, and filling said pastry with a moist filling, the improvement comprising the step of:

insulating the interior of said pastry strip from softening and dissolving effects of said filling by applying an insulating coating to said pastry strip prior to the step of winding said strip, so as to produce an insulating layer on said interior of said wound pastry strip;

whereby said insulating coating remains impervious and the soft filling cannot penetrate into the baked pastry.

2. The process defined in claim 1 wherein said coating step comprises the step of pouring a coating substance on said pastry strip.

3. The process defined in claim 1 wherein said insulating step comprises the step of spraying said coating material on said pastry strip.

4. The process defined in claim 1 wherein said insulating step comprises the step of sprinkling said coating material on said pastry strip.

5. The process defined in claim 1 wherein said insulating step includes coating said pastry strip substantially along its entire width, whereby the coating material present on overlapping sections of said strip further provides a bonding action between the overlapping layers.

6. The process defined in claim 1 further comprising the step of limiting the width of said coating material subsequent to the step of applying said coating material to said pastry strip.

7. The process defined in claim 1 further comprising the step of limiting the thickness of said coating material subsequent to the step of applying said coating material to said pastry strip.

8. A process according to claim 1, wherein the coating substance is applied only on an area of width of the pastry strip located within the overlapping zone.

9. A process for producing hollow pastries comprising the steps of:

a. running a strip of baked pastry material off a baking drum;

b. conducting said strip around a deflection roller;

c. applying an insulating coating substance to one side of said strip; and d. applying said strip to a winding spindle for forming said strip into a hollow shape wherein said strip is applied to said spindle with said insulating substance facing said spindle;

e. introducing a moist filling into said hollow shape;

whereby said insulating coating remains impervious and the moist filling cannot penetrate the baked pastry.

10. The process defined in claim 9 further comprising the step of controlling the width of said insulating substance by using a doctor blade.

11. The process defined in claim 9 further comprising the step of feeding said strip to said spindle at an angle calculated for providing a desired overlap.

12. The process defined in claim 11 further comprising the step of introducing a filling into the hollow shape formed by said pastry strip through a longitudinal bore in said spindle.

13. The process defined in claim 12 wherein the step of applying said strip to said spindle provides a double overlap to said pastry material.

14. The process defined in claim 13 wherein said insulating step further comprises the step of flavoring said pastry strip by using a chocolate material for insulating said pastry strip.

15. The process defined in claim 14 wherein said insulating step includes the step of applying said insulating coating substance only between overlapping turns of said pastry strip.

* * * * *